(12) United States Patent
Laifenfeld et al.

(10) Patent No.: US 9,457,742 B2
(45) Date of Patent: Oct. 4, 2016

(54) WIRELESS COMMUNICATION EXTENSION FOR CAN BASED ELECTRICAL ARCHITECTURES

(71) Applicant: GM GLOBAL TECHNOLOGY OPERATIONS LLC, Detroit, MI (US)

(72) Inventors: Moshe Laifenfeld, Haifa (IL); Tal Philosof, Givatayim (IL)

(73) Assignee: GM Global Technology Operations LLC, Detroit, MI (US)

( * ) Notice: Subject to any disclaimer, the term of this patent is extended or adjusted under 35 U.S.C. 154(b) by 126 days.

(21) Appl. No.: 14/322,101

(22) Filed: Jul. 2, 2014

(65) Prior Publication Data

US 2016/0001718 A1    Jan. 7, 2016

(51) Int. Cl.
*B60R 16/023*    (2006.01)
*H04L 12/64*    (2006.01)
*H04W 84/00*    (2009.01)

(52) U.S. Cl.
CPC ....... *B60R 16/0231* (2013.01); *H04L 12/6418* (2013.01); *H04W 84/005* (2013.01)

(58) Field of Classification Search
CPC .................................................. B60R 16/023
See application file for complete search history.

(56) References Cited

U.S. PATENT DOCUMENTS

| 6,424,119 | B1 * | 7/2002 | Nelson et al. | 320/116 |
|---|---|---|---|---|
| 2005/0192727 | A1 * | 9/2005 | Shostak et al. | 701/37 |
| 2005/0273218 | A1 * | 12/2005 | Breed et al. | 701/2 |
| 2006/0180371 | A1 * | 8/2006 | Breed et al. | 180/197 |
| 2007/0133578 | A1 * | 6/2007 | Tani | 370/401 |
| 2010/0329272 | A1 * | 12/2010 | Tsuboi et al. | 370/401 |
| 2012/0265359 | A1 * | 10/2012 | Das et al. | 700/292 |
| 2012/0296567 | A1 * | 11/2012 | Breed | 701/468 |
| 2013/0197777 | A1 * | 8/2013 | Sloan et al. | 701/102 |
| 2015/0110287 | A1 * | 4/2015 | Holdren et al. | 381/86 |

* cited by examiner

*Primary Examiner* — David Bilodeau
(74) *Attorney, Agent, or Firm* — John A. Miller; Miller IP Group, PLC

(57) ABSTRACT

A method for communicating using a hybrid vehicle communications network including a combination of wired and wireless electronic control units (ECUs) and wired and wireless peripherals. The network includes a plurality of ECUs that include a plurality of wireless ECUs. The network also includes a plurality of peripheral devices, where one or more of the peripheral devices receive commands from one or more of the ECUs and one or more of the peripheral devices provide signals to the ECUs, and where the plurality of peripherals include at least one wireless peripheral. Wireless transmission signals transmitted from one of the wireless peripherals is received by all of the wireless ECUs. The method performs an arbitration process where a message provided from one of the wireless ECUs is placed on a communications backbone based on a quality of the transmission signal from the wireless peripheral.

21 Claims, 2 Drawing Sheets

WIRELESS COMMUNICATION EXTENSION FOR CAN BASED ELECTRICAL ARCHITECTURES

BACKGROUND OF THE INVENTION

1. Field of the Invention

This invention relates generally to a vehicle communications network and, more particularly, to a vehicle hybrid communications network including a combination of wired and wireless ECUs and wired and wireless peripherals, where the network performs an arbitration process where a message provided from one of the wireless ECUs is placed on a communications backbone based on a quality of the transmission signal from one of the wireless peripherals.

2. Discussion of the Related Art

Modern vehicles employ many sensors, actuators, controllers, sub-systems, buses, etc. that require electrical wiring. As the number of vehicle systems increases, so does the wiring necessary to support those systems. However, there are a number of disadvantages with providing wires in a vehicle, especially many wires. For example, the electrical conductor of the wires, such as copper, has significant weight. As the weight of a vehicle increases, fuel efficiency decreases. Further, wiring in a vehicle is susceptible to damage, which increases the warranty cost of the vehicle. Also, requiring wiring throughout the vehicle reduces the flexibility in design and manufacturing of the vehicle. Further, at least some of the wiring in a vehicle often requires periodic maintenance. Also, wiring adds significant expense and cost. Further, during manufacture of the vehicle, assembly of cable harnesses often causes problems as a result of breaking or bending of connector pins. Therefore, it would be desirable to eliminate or reduce the wiring in a vehicle.

It is known in the art to employ wireless technology in a vehicle for communications purposes at least in limited circumstances. However, the transmission of wireless signals also suffers from a number of disadvantages including interference with signals from other vehicles, potential interference with signals from consumer devices brought into the vehicle, unnecessary radiation inside the passenger compartment of the vehicle, and fading issues, which result in loss of signal, requiring larger transmitted power and large power consumption.

SUMMARY OF THE INVENTION

The following disclosure describes a method for communicating using a hybrid vehicle communications network including a combination of wired and wireless electronic control units (ECUs) and wired and wireless peripherals. The network includes a plurality of ECUs each operating a communications algorithm and performing predefined functions, where the plurality of ECUs include a plurality of wireless ECUs. The network also includes a plurality of peripheral devices, where one or more of the peripheral devices receive commands from one or more of the ECUs and one or more of the peripheral devices provide signals to the ECUs, and where the plurality of peripherals include at least one wireless peripheral. Wireless transmission signals transmitted from one of the wireless peripherals is received by all of the wireless ECUs. The method performs an arbitration process where a message provided from one of the wireless ECUs is placed on a communications backbone based on a quality of the received signal from the wireless peripheral.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a vehicle communications network including a combination of wired and wireless ECUs and wired and wireless peripherals is merely exemplary in nature, and is in no way intended to limit the invention or its applications or uses.

The present invention proposes a hybrid vehicle communications architecture or network that combines wireless and wired communications technologies among multiple peripherals and electronic control units (ECU). Some reasons for adopting a hybrid architecture include increased robustness, reliability and lower latency, while preserving both wireless and wired resources.

Figure 1:
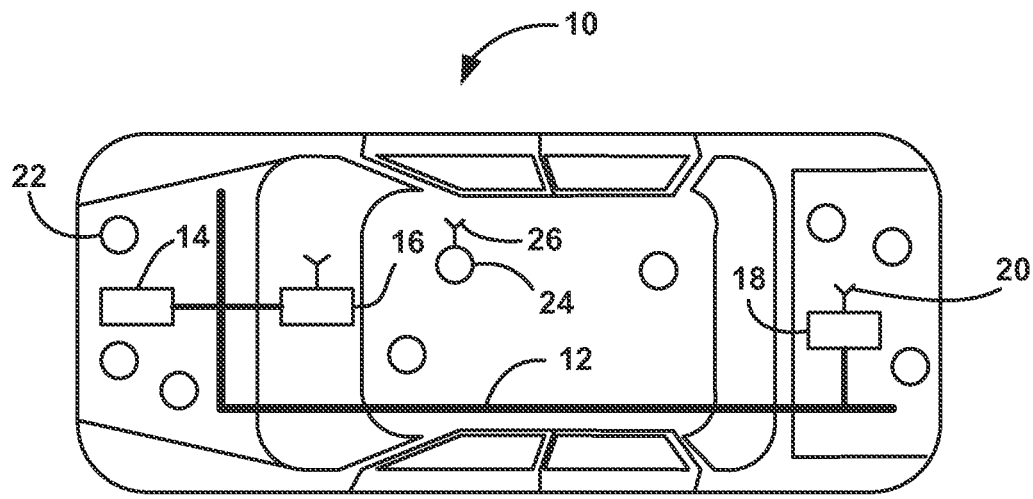
FIG. 1 is an illustration of a vehicle including a communications network having a combination of wired and wireless ECUs and wired and wireless peripherals.

FIG. 1 is a top view illustration of a vehicle 10 showing a simplified representation of a communications architecture on the vehicle 10. Particularly, the vehicle 10 includes a CAN bus 12 to which is connected a number of ECUs some of which are ECUs 14 that are not equipped with wireless technology and some of which are wireless ECUs (WECUs) 16 and 18, where each of the WECUs 16 and 18 include wireless technology represented generally by 20. The vehicle 10 also includes a number of peripherals, such as sensors, switches, actuators, etc., some of which are hard-wired peripherals 22 and some of which are wireless peripherals 24 including an antenna 26. The communications architecture is intended to be a representation of one or more of the communications architectures that may exist on a vehicle of any type, where several ECUs each performing a certain function are generally electrically coupled to a controller area network (CAN) bus for a certain vehicle system, such as a vehicle body, engine, chassis, etc. As will become apparent from the discussion below, any suitable configuration of some hard-wired and some wireless ECUs and some hard-wired and some wireless peripherals can be employed.

In one embodiment, the wireless channels of those peripherals and ECUs that are selected to be wireless are mutually independent (as possible), which means that they are at locations on the vehicle relative to other vehicle components where the wireless signals transmitted by or received by the peripheral or WECU are less likely to suffer from fading issues at the same time that would cause signal corruption and significantly reduce reception quality. Furthermore, WCEUs are located so that they cover the entire vehicle vicinity with high average signal-to-noise ratio. In order to further overcome fading issues, the present invention proposes employing signal diversity as will be discussed in detail below.

Figure 2:
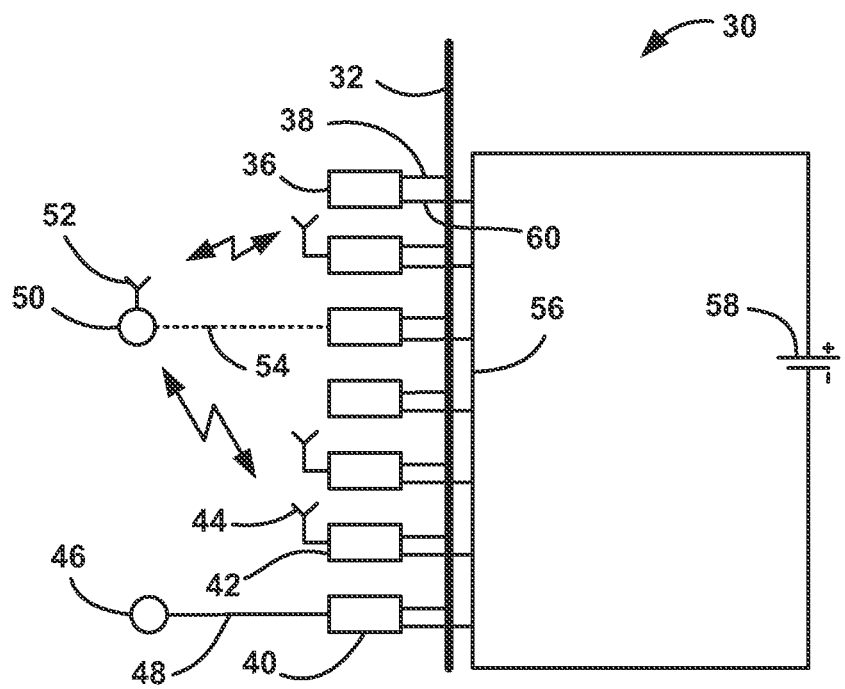
FIG. 2 is a block diagram of a vehicle communications network including a combination of wired and wireless ECUs and wired and wireless peripherals.

FIG. 2 is a schematic block diagram of a simplified vehicle communications network 30 of the type discussed above for a certain vehicle system, but removed from the vehicle 10. The network 30 includes a CAN bus 32 and several ECUs 36 electrically coupled to the CAN bus 32 by a line 38 for controlling separate parts of the particular vehicle system, where the ECUs 36 provide data messages on the bus 32 available to be received by all of the other ECUs 36 coupled to the bus 32, and where all of the ECUs 36 receive control and command messages from the bus 32. Some of the ECUs 36 are hard-wired ECUs, represented by ECU 40, and some of the ECUs 36 are wireless ECUs, represented by WECU 42 including an antenna 44.

As above, the communications network 30 also includes a number of peripherals that are in communication with one or more of the ECUs 36 that may receive commands to perform a certain operation, such as a door lock, or provide certain sensor data, such as pressure, temperature, etc. Some of the peripherals may be hard-wired peripherals, such as peripheral 46 that is hard-wired to the ECU 40 by a wire 48, and some of the peripherals may be wireless peripherals, such as a peripheral 50 including an antenna 52, which also may be hard-wired to an ECU 36 by line 54.

It is known in the art to provide powerline communications (PLC) where a powerline providing power to the various ECUs on a vehicle from, for example, the vehicle battery are also used as an electrical conductor to provide communications signals, such as digital data bits modulated on to a high frequency carrier signal. The CAN protocol is used on the physical layer of the PLC. The present invention also proposes a hybrid of wired and wireless peripherals and ECUs communicating with each other as discussed herein using the powerlines providing power to the ECUs 36.

To illustrate this embodiment, the communications network 30 also includes a powerline 56 electrically coupled to a power source 58, such as a vehicle battery. All of the ECUs 36 in the network 30 are coupled to the powerline 56 on lines 60 from which they receive power. Thus, in the same way as discussed herein that signals are modulated onto the CAN bus 32 to be sent to other ECUs 36 in the network 30, those same messages can also be modulated onto the powerline 50 to be sent to the ECUs 36. Certain communications architectures may employ both communications over a CAN bus and a powerline. In theory, all of the peripherals that receive power from the vehicle battery can be in electrical communication with all of the ECUs on the vehicle that are also coupled to the vehicle battery. It is well known that PLCs and CAN buses are limited in bandwidth, i.e., bits per second, which limits the amount of data that can be sent from the peripherals to the ECUs 36 and commands that can be sent from the ECUs 36 to the peripherals. Because CAN buses are limited in their bandwidth, a number of CAN buses for different vehicle systems are typically required on the vehicle.

The present invention proposes providing some combination of hard-wired and wireless ECUs and hard-wired and wireless peripherals in connection with a PLC and/or CAN buses sometimes referred to generally herein as a backbone, where a majority of the data can be transmitted wirelessly and the hard-wired connections can be reserved for more critical data flow. Such a combination of wireless technology and the PLC can increase system reliability and security. The hybrid wired and wireless communications network discussed herein is carefully designed so that the number of wires required for the network is reduced over traditional vehicle communications networks. It is noted that the discussion below refers to putting messages on the CAN bus 32, however, in that discussion the CAN bus 32 can be replaced with the powerline 56 as the backbone.

Typically, each ECU 36 controls several peripherals, where such an ECU is referred herein to as a target ECU for those peripherals. As will be discussed, one or more of those peripherals may be a wireless peripheral and the target ECU may be a hard-wired or a wireless ECU. The target ECU may rely on the WECUs 42 in the network 30 to communicate with the wireless peripherals 50. All of the WECUs 42 that receive the wireless signals from the wireless peripherals 50 put that message on the CAN bus 32 and through appropriate digital signal coding, the target ECU extracts data from the CAN bus 32 as appropriate. Likewise, if the target ECU wants to send a signal to the wireless peripheral 50, it will provide a coded signal on the CAN bus 32 that is deciphered by all of the WECUs 42 electrically coupled to the bus 32 and all of those WECUs 42 will wirelessly transmit the particular message to the peripheral 50. It is noted that many peripherals can be communicating with a single ECU or many peripherals can be communicating with many ECUs. It is also noted that in a different scheme one or more of the WECUs 42 will operate as simple relays (amplify-and-forward), where bits picked from the CAN bus 32 are transmitted over the wireless media and vice versa. In this way the operation is very simple and latency is small. However, offloading traffic to increase system overall bandwidth is not possible.

As discussed, several WECUs can cooperate over the CAN bus 32 to help a wireless peripheral to convey its data to its target ECU. In this scenario a wireless peripheral's transmission is being received by multiple WECUs. Since the wireless channel is unreliable and can suffer from fading, the target ECU may not receive the message without errors. Furthermore, the target ECU may not have wireless capabilities at all and is dependent on wired communications from the WECUs to relay the peripheral information to it.

CAN buses are extremely loaded, and therefore relaying the peripheral's message by multiple WECUs in a time division fashion may be too expensive. On the other hand, relying on only a single arbitrary WECU can result in low reliability due to the wireless channel temporal effects. A built in arbitration mechanism for the CAN bus can be used to reduce the load on the CAN bus 32 and achieve better reliability and performance.

The CAN bus 32 uses open-collector transceivers, which means that zero bits are dominant while one bits are recessive. Particularly, if a collision occurs and two nodes transmit opposite bits at the same time, then the received bit would be zero (this channel is often referred to as the AND channel). The CAN standard uses this property for arbitration. The CAN message ID determines its priority, where the lower the value—the higher the priority. In this arbitration stage multiple nodes can simultaneously transmit their message IDs, however at the end, and due to the AND channel operation, only the lowest value ID prevails. All of the other nodes remain silent for the rest of the transmission allowing contention free transmission of the highest priority message.

In a first embodiment, the CAN arbitration process selects the best WECU to transmit its received information, referred to herein as the max selection method. In the max selection method, only the WECU 42 with the highest received quality (SNR, CRC or LLR measures) transmits its message on the CAN bus 32. The WECUs 42 translate their received quality into a message ID, where the higher the quality the lower the value. The CAN arbitration process guarantees that only the highest message quality from the WECU 42 sends its data to the target ECU.

A second embodiment repeats the first embodiment iteratively, where at each iteration, the WECU with the best quality, and where quality is based on its received wireless signal and the previous iterations received data from other WECUs, is selected using the same arbitration process.

In a third embodiment, all of the WECUs transmit their received bits simultaneously, referred to herein as the wireless CAN extension (WiCAN). In this embodiment, all of the WECUs 42 act as simple relays, where if a dominant bit is received over the wired CAN it is also transmitted as a dominant bit over the wireless link and vice versa.

On-off-keying (OOK) modulation is a natural modulation method for the wireless technology with "on" being the dominant bit. Further, the communications protocol can use wireless communications in the ISM frequency bands, and specifically the 902-928 MHz and 433.05-434.79 frequency bands. The WECUs 42 can use predefined or dynamically selected beam-forming to communicate with any peripheral including using coherent modulation and adjusting each WECU's transmitted signal phase to reach a constructive combination at the peripheral receiver. The WECUs 42 can use non-coherent modulation and transmit simultaneously to all of the peripherals to increase signal-to-noise ratio. The transmit power of the WECUs 42 can be larger than the transmit power of the peripherals and can be increased as the number of wireless peripherals increases. Further, CAN inter-WECU messages can be wirelessly offloaded to reduce CAN bus load and increase robustness and resilience to CAN bus faults. Error-correcting codes can be employed on the data on top of the CAN protocol to increase reliability, where the error-correcting codes are rateless codes with minimum latency guarantees including differential latency guarantees that are higher for recent packets and lower for older packets.

As discussed above, a particular wireless peripheral may send its message to several WECUs, where each WECU 42 may receive that message with differing levels of fidelity, quality and data corruption. According to the invention, each of the WECUs 42 that receives a signal from a wireless peripheral will encode its reception quality of that signal into the message that it puts onto the bus 32. For this situation, the present invention proposes an arbitration process as discussed above for selecting which one of the several messages having different level of quality will be transmitted onto the CAN bus 32.

Figure 3:
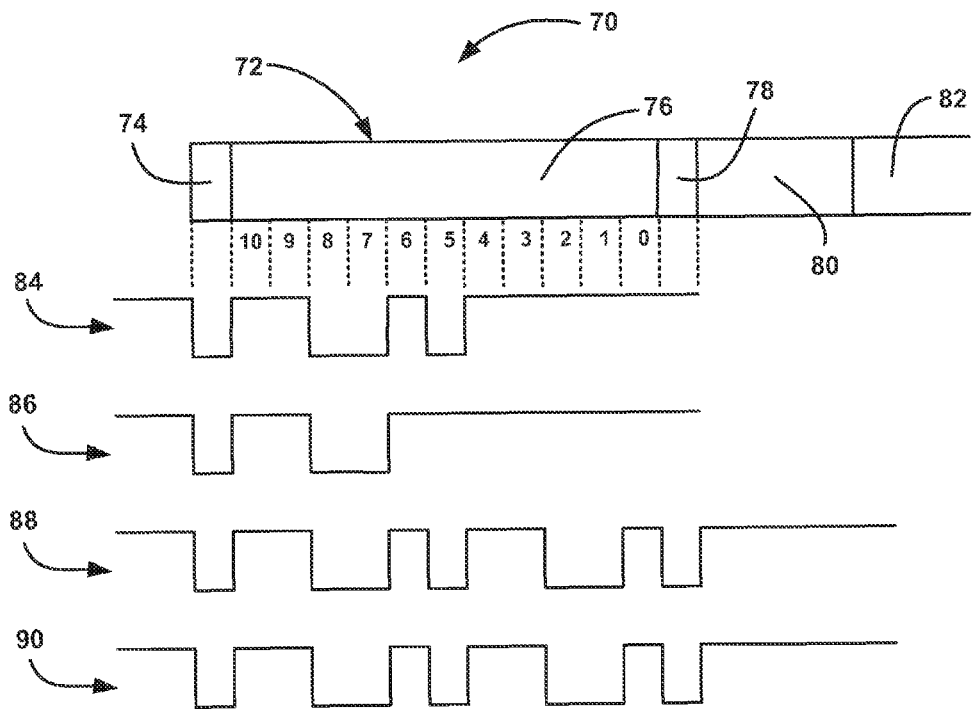
FIG. 3 is an illustration of a message format and signals for a CAN protocol illustrating an arbitration process.

FIG. 3 is an illustration 70 depicting an arbitration process for a known CAN protocol to determine which message from a particular WECU, sometimes referred to herein as a node, will be transmitted on the CAN bus 32 at a particular point in time based on message quality, where the CAN protocol gives priority to a zero bit over a one bit. The illustration 70 shows a message 72 having a known bit format for a bit data stream and includes a start-of-frame bit 74, identifier bits 76, an RTR bit 78, control field bits 80 and the data being broadcast in a data bit field 82. The identifier bits 76 perform the arbitration, where the priority of the message from a particular WECU is determined as to whether that message will be transmitted on the bus 32, where the value of the identifier bits is low based on a higher priority transmission. The identifier bits 76 include 11 bits, 0-10, where, in this example, bits 6-10 are fixed ID bits and bits 0-5 are quality bits identifying the quality of the data field bits 82. More particularly, the identifier bits 0-5 are used to identify the quality, such as signal-to-noise ratio (SNR), cyclical redundancy check (CRC), etc., of the message that the WECU 42 is putting on the bus 32. In other words, the WECU 42 will set the quality of the message it received from the peripheral 50 in the identifier bits 76 with a certain priority, i.e., number of low bits, based on how high the quality of the message is that it received from the wireless peripheral 50.

In this non-limiting example, three WECUs, referred to as nodes, are attempting to put the same message on the CAN bus 32, where the messages may have different levels of quality. A first node attempts to transmit a message having bit stream 84 onto the CAN bus 32, a second node attempts to transmit a message having bit stream 86 onto the CAN bus 32, and a third node attempts to transmit a message having bit stream 88 onto the CAN bus 32, all of which have the format of the message 72 and have different levels of message quality. The identifier bits 6-10 in the message from the nodes are the same because the message is intended for the target ECU.

At identifier bit 5, the bit in the data stream 86 from the second node is high indicating that it has a lower quality than the messages from the first and third nodes. At bit 2, the identifier bit in the third node message goes low while the identifier bit 2 in the first node message remains high, indicating that the message from the third node has a higher priority (quality) than the message from the first node. Based on this arbitration process, the message on the third node is transmitted on the bus 32 after the identifier section has satisfied the arbitration. When a particular node recognizes that another node has a higher priority bit in the identifier portion of the message, that node will stop transmitting its message. Thus, the third node message 88 will take over the bus for transmitting the message including the data 82. In other words, through the arbitration process discussed herein, the bit stream 88 from the third node has the highest quality and is a bit stream 90 that is transmitted on the bus 32. By selectively identifying the quality of the transmission based on the arbitration bits in the identifier bits 76 in this manner, the CAN protocol can allow only one of the messages received from the particular peripheral at all of the WECUs 42 to be put on the bus at the particular message slot. The WECUs 42 that lost the arbitration receive the message from the highest quality WECU and re-estimate their received bit and overall quality measure. Maximum ratio combining (MRC) can be used for instance for this purpose. The process then repeats (without the WECUs that already transmitted their messages over the CAN bus) until the CRC is met.

The discussion herein includes uplink signal transmissions where the peripherals 50 transmit messages wirelessly to be received by all of the WECUs 42 as a first transmission hop and where all of those WECUs 42 then put that message onto the CAN bus 32 as a second transmission hop. Likewise, for downlink signal transmissions, all of the WECUs 42 will receive a message to be transmitted from the CAN bus 32 as a first transmission hop and then will transmit the message wirelessly as a second transmission hop. When synchronized by the CAN protocols, the WECUs transmit the message simultaneously over the wireless channel using non-coherent modulation to form a simulcast scheme. A more involved scheme can target a specific peripheral and perform distributed beamforming over the WECUs 42, as is well known by those skilled in the art.

Figure 4:
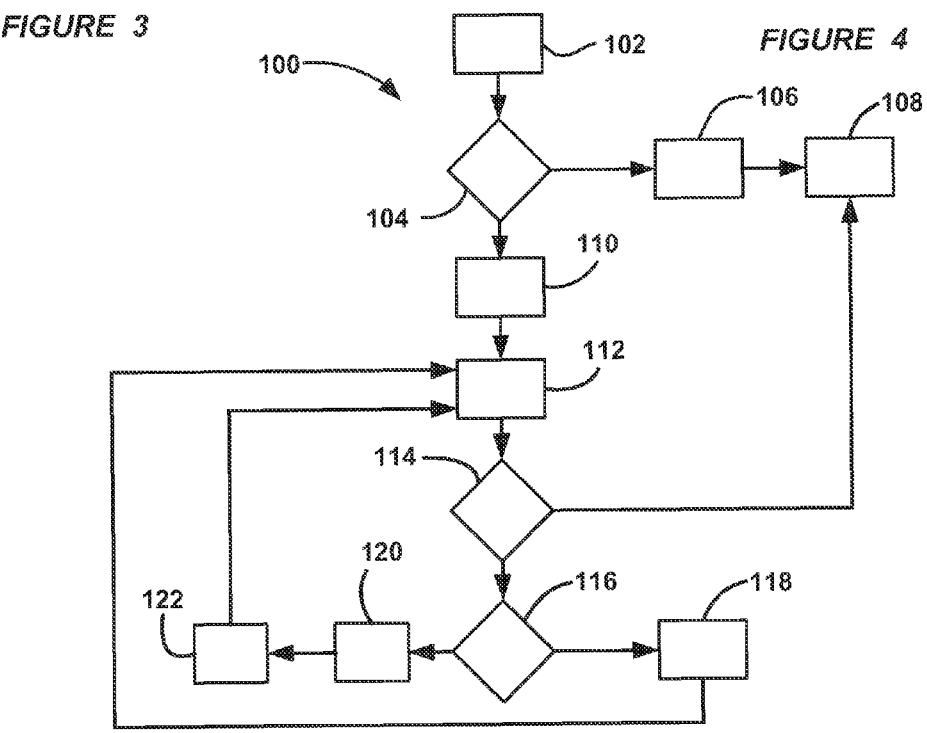
FIG. 4 is a flow chart diagram showing a protocol for hybrid wireless/wired communications between a peripheral and a target ECU through multiple ECUs with wireless capability.

FIG. 4 is a flow chart diagram 100 depicting a WECU processing algorithm that provides the arbitration process for the CAN bus according to the quality of the wireless received signals for the uplink transmissions, as discussed above. At box 102, the particular WECU receives the wireless message from the particular peripheral. A CRC is performed on the message at decision diamond 104, and if it passes, the message has the highest quality and is transmitted at box 106, and the algorithm ends at box 108. The CRC determines if the bits are corrupted or correctly received by the WECU 42.

If the message does not pass the CRC at the decision diamond 104, then the algorithm starts an iterative procedure at box 110, which includes setting the number of iterations at iter=1. The algorithm calculates the fidelity of the message at box 112. At decision diamond 114, the WECU 42 checks if the number of iterations has reached a maximum iteration or if the message has been resolved, and if so, the algorithm ends at the box 108. If the number of iterations is not at the maximum or the message has not been resolved at the decision diamond 114, then the algorithm determines whether the calculated fidelity is the highest possible fidelity at decision diamond 116. If the calculated fidelity is the highest possible fidelity at the decision diamond 116, then the WECU 42 transmits the message at box 118 with certain modifications, and recalculates the fidelity at the box 112. If the calculated fidelity is not the highest possible fidelity at the decision diamond 116, then typically another WECU 42 with a higher fidelity will transmit its message on the CAN bus 32, and this message can be used to increase the fidelity at the particular WECU 42 at box 120. Specifically, the particular WECU 42 deciphers the message with a higher fidelity received from another WECU on the CAN bus 32 and uses that message to correct corrupted bits in the message that the particular WECU 42 has received in order to increase its message fidelity. The algorithm then increases the iteration number by one at box 122 and returns to the box 112 to recalculate the fidelity of the message.

The CAN protocol may employ a CAN flexible data-rate link that allows for very fast data transmissions. If this protocol is employed, the same iterative procedure can be applied.

During the downlink transmission, each WECU that receives a message from a particular ECU to be sent to a particular peripheral will all send that message wirelessly. Each WECU performs a beam-forming process, well known to those skilled in the art, so that the signals are matched in phase when they are received by the peripheral 50 so that the peripheral 50 receives all of the wireless messages from all of the WECUs 42 coherently. Further, the ECUs 36 that are coupled to the bus 32 are synchronized through the same clock signal so that the transmissions from the WECUs 42 can be transmitted through simulcast techniques to be non-coherently received by the wireless peripheral 50.

The above described method requires two hops. In the first hop the entire packet is decoded on one media (CAN bus or the wireless media) before being retransmitted on the other media. This introduces an additional latency of at least one packet transmission time. Alternatively, the WECUs 42 can be used as simple relays, operating on a bit-by-bit manner, amplifying-and-forwarding any dominant bit on one media to the other. In that case the WECUs 42 do not adhere to the CAN protocol (as their operation is on the bit-level) and multiple WECUs can transmit simultaneously on the CAN bus 32 reaching consensus for all the bits of the CAN frame (and not only the arbitration field) without causing error frames to be transmitted. The latency of such a scheme is not larger than the propagation delay allowed by the CAN protocol. Using smart decision threshold in the uplink and cooperation schemes (such as simulcast) on the downlink high end-to-end communication reliability can be reached. Clearly, such a scheme cannot be used to increase CAN bus capacity, however, it can serve as a wireless extension, as well as to increase robustness in case of the CAN bus 32 disconnects. In such a case the WECUs 42 will maintain connectivity between the disconnected CAN bus networks.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An electrical architecture (EA) comprising:
  a plurality of electronic control units (ECUs) interconnected by a wired CAN bus, wherein some of the ECU's are wireless ECUs (WECUs); and
  a plurality of wired and wireless peripherals connected to the CAN bus using either wireless or wired communications or both, wherein communications including wireless communications between the ECUs and the peripherals is bidirectional, and wherein CAN inter-WECU messages are wirelessly offloaded to reduce CAN bus load and increase robustness and resilience to CAN bus faults.

2. The EA according to claim 1, wherein the WECUs convey information wirelessly from and to the peripherals by employing wireless channel diversity where messages from a peripheral is received by all of the WECUs and a message to a peripheral is transmitted by all of the WECUs.

3. The EA according to claim 1, wherein the WECUs use a CAN arbitration process to reduce traffic over the CAN bus.

4. The EA according to claim 3, wherein the CAN arbitration process employs iteration to identify a WECU with a best residual quality of the received signal where only that WECU transmits at a particular iteration.

5. The EA according to claim 1, wherein the WECUs operate as simple relays on a bit-by-bit basis by repeating dominant bits received on the CAN bus, and vice versa.

6. The EA according to claim 5, wherein the wireless communications between the WECUS and the CAN bus uses on-off-keying (OOK) modulation where dominant CAN bits are relayed to 'on' bits.

7. The EA according to claim 1, wherein the wireless communications is in ISM bands.

8. The EA according to claim 7, wherein the ISM bands include the 902-928 MHz and 433.05-434.79 frequency bands.

9. The EA according to claim 1, wherein the WECUs use predefined or dynamically selected beam-forming to communicate with any peripheral including using coherent modulation and adjusting each WECU's transmitted signal phase to reach a constructive combination at the peripheral receiver.

10. The EA according to claim 1, wherein the WECUs use non-coherent modulation and transmit simultaneously to all of the peripherals to increase signal-to-noise ratio.

11. The EA according to claim 1, wherein transmit power of the WECUs is larger than the transmit power of the peripherals and is increased as the number of wireless peripherals increases.

12. The EA according to claim 1, wherein multiple CAN buses operate over wireless channels where the multiple wired CAN buses can be extended with multiple wireless channels simultaneously.

13. The EA according claim 12, wherein error-correcting codes are employed on the data on top of the CAN protocol to increase reliability.

14. The EA according to claim 13, wherein the error-correcting codes are rateless codes with minimum latency guarantees including differential latency guarantees that are higher for recent packets and lower for older packets.

15. The EA according to claim 1, wherein the plurality of peripherals include one or more of switches, sensors and actuators.

16. The EA according to claim 1, wherein the EA is on a vehicle.

17. An electrical architecture (EA) for a vehicle, said EA comprising:
 a plurality of electronic control units (ECUs) interconnected by a wired CAN bus, wherein some of the ECU's are wireless ECUs (WECUs); and
 a plurality of wired and wireless peripherals connected to the CAN bus using either wireless or wired communications or both, wherein communications including wireless communications between the ECUs and the peripherals is bidirectional, wherein the WECUs convey information wirelessly from and to the peripherals by employing wireless channel diversity where messages from a peripheral are received by all of the WECUs and a message to a peripheral is transmitted by all of the WECUs, and wherein the plurality of peripherals include one or more of switches, sensors and actuators, and wherein error-correcting codes are employed on the data on top of the CAN protocol to increase reliability.

18. The EA according to claim 17, wherein the WECUs operate as simple relays on a bit-by-bit basis by repeating dominant bits received on the CAN bus, and vice versa.

19. An electrical architecture (EA) comprising:
 a plurality of electronic control units (ECUs) interconnected by a wired CAN bus, wherein some of the ECU's are wireless ECUs (WECUs); and
 a plurality of wired and wireless peripherals connected to the CAN bus using either wireless or wired communications or both, wherein communications including wireless communications between the ECUs and the peripherals is bidirectional, and wherein the WECUs use a CAN arbitration process to reduce traffic over the CAN bus and the CAN arbitration process employs iteration to identify a WECU with a best residual quality of the received signal where only that WECU transmits at a particular iteration.

20. An electrical architecture (EA) comprising:
 a plurality of electronic control units (ECUs) interconnected by a wired CAN bus, wherein some of the ECU's are wireless ECUs (WECUs); and
 a plurality of wired and wireless peripherals connected to the CAN bus using either wireless or wired communications or both, wherein communications including wireless communications between the ECUs and the peripherals is bidirectional, and wherein a transmit power of the WECUs is larger than a transmit power of the peripherals and is increased as the number of wireless peripherals increases.

21. An electrical architecture (EA) comprising:
 a plurality of electronic control units (ECUs) interconnected by a wired CAN bus, wherein some of the ECU's are wireless ECUs (WECUs); and
 a plurality of wired and wireless peripherals connected to the CAN bus using either wireless or wired communications or both, wherein communications including wireless communications between the ECUs and the peripherals is bidirectional, wherein multiple CAN buses operate over wireless channels where the multiple wired CAN buses can be extended with multiple wireless channels simultaneously, and wherein error-correcting codes are employed on the data on top of the CAN protocol to increase reliability.

* * * * *